(12) United States Patent
Wray

(10) Patent No.: US 7,223,430 B2
(45) Date of Patent: May 29, 2007

(54) APPARATUS AND METHOD FOR MAKING CONFECTIONERY ON A STICK

(75) Inventor: Martyn Thomas Wray, Stamford (GB)

(73) Assignee: Baker Perkins Limited, Southampton (GB)

( * ) Notice: Subject to any disclaimer, the term of this patent is extended or adjusted under 35 U.S.C. 154(b) by 180 days.

(21) Appl. No.: 10/513,248

(22) PCT Filed: Apr. 17, 2003

(86) PCT No.: PCT/GB03/01680

§ 371 (c)(1),
(2), (4) Date: May 23, 2005

(87) PCT Pub. No.: WO03/092401

PCT Pub. Date: Nov. 13, 2003

(65) Prior Publication Data

US 2005/0202124 A1    Sep. 15, 2005

(30) Foreign Application Priority Data

May 2, 2002    (GB) .................................. 0210093.1

(51) Int. Cl.
*A23G 7/00*    (2006.01)
*A23G 3/00*    (2006.01)

(52) U.S. Cl. .................... 426/421; 425/126.2; 425/453; 426/515

(58) Field of Classification Search ............. 425/126.2, 425/453; 426/421, 515
See application file for complete search history.

(56) References Cited

U.S. PATENT DOCUMENTS 3,730,661 A  *  5/1973  Tremblay ................. 425/126.2

FOREIGN PATENT DOCUMENTS

GB        2248169 A  *  4/1992

* cited by examiner

*Primary Examiner*—Robert B. Davis
(74) *Attorney, Agent, or Firm*—John P. White; Cooper & Dunham LLP

(57) ABSTRACT

Apparatus (1) and method for moulding lollipops, the apparatus comprising stick receiving means (6) and a mould forming surface (3) of a mould (15), the stick receiving means being mounted for pivotal movement relative to the mould forming surface through substantially ninety degrees. In use the apparatus is passed around a circuit (34) and engagement between the apparatus and a cam track (35) is such that a stick held by the stick receiving means is pivoted through substantially ninety degrees into the mould so that confectionery material can be poured into the mould and around the stick. As the apparatus further progresses around the circuit the formed lollipop is pivoted out of the mould for release from the stick receiving means.

10 Claims, 6 Drawing Sheets

APPARATUS AND METHOD FOR MAKING CONFECTIONERY ON A STICK

This application is a §371 National Stage of PCT International Application No. PCT/GB03/01680, filed Apr. 17, 2003, designating the United States and claiming priority of Great Britain Patent Application No. 0210093.1, filed May 2, 2002, the contents of which are hereby incorporated by reference into this application.

The present invention relates to apparatus and a method for the manufacture of confectionery, and in particular, but not exclusively, to the manufacture of lollipops.

According to a first aspect of the invention there is provided a lollipop mould assembly which comprises stick receiving means and a mould forming surface of a mould, the stick receiving means being mounted for pivotal movement relative to the mould forming surface from a first condition to a second condition, the arrangement being such that, in use, a lollipop stick is received by the stick receiving means in the first condition, and relative pivotal movement is then brought about to cause the stick receiving means to adopt the second condition in which confectionery material is provided into the mould and around at least part of the lollipop stick.

Preferably, the extent of relative pivotal movement from the first condition to the second condition is substantially ninety degrees.

In a preferred embodiment the stick receiving means can receive the stick in a substantially vertical condition, and the stick receiving means then moves through ninety degrees to a substantially horizontal condition. This is particularly advantageous when lollipops are produced which require the stick to lie horizontally on the mould during the provision of the confectionery.

The assembly preferably comprises actuation means operative to cause controlled relative pivotal movement of the stick receiving means in response to a progressive movement of the mould assembly along a circuit of a lollipop manufacturing apparatus.

The actuation means preferably comprises a cam follower of which the movement is determined by the configuration of a cam track.

The assembly desirably comprises location means which is such that when the stick is in situ in the location means the stick is in the second condition.

In the second condition a distal end of the stick is most preferably in a region which is defined by the mould forming surface.

The stick receiving means may be provided by a bore. Stick retention means may be provided which comprises a spring loaded feature which is biased inwardly of the bore.

According to a second aspect of the invention there is provided lollipop manufacturing apparatus comprising lollipop stick receiving means, a mould comprising a mould forming surface and a lollipop manufacturing circuit, the stick receiving means being mounted for pivotal movement relative to the mould forming surface, and stick receiving means being adapted to receive a lollipop stick, the arrangement of the apparatus being such that, in use, the position of the stick receiving means relative to the mould forming surface is determined by the position of the stick receiving means along the circuit.

According to a third aspect of the invention there is provided a process of manufacturing lollipops comprising locating a lollipop stick in stick receiving means of a lollipop mould assembly, the stick receiving means being in a first condition, causing pivotal movement of the stick receiving means relative to a mould forming surface of a mould of the assembly so that the mould assembly adopts a second condition in which confectionery material is provided into the mould and around at least part of the lollipop stick.

One embodiment of the invention will now be described, by way of example only, with reference to the accompanying drawings in which.

Figure 1:
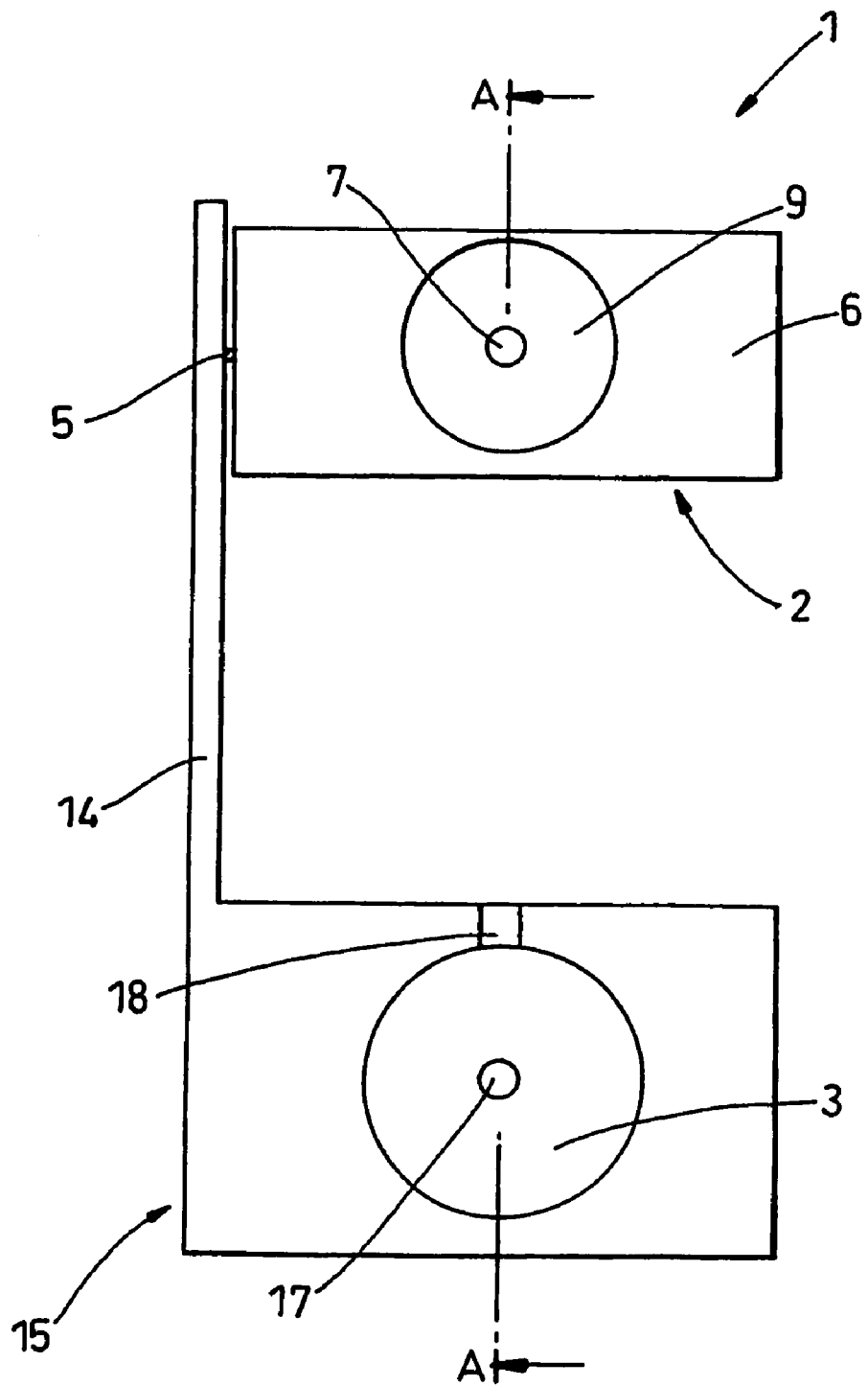
FIG. 1 is a plan view of a mould assembly in a first condition.
Figure 2:
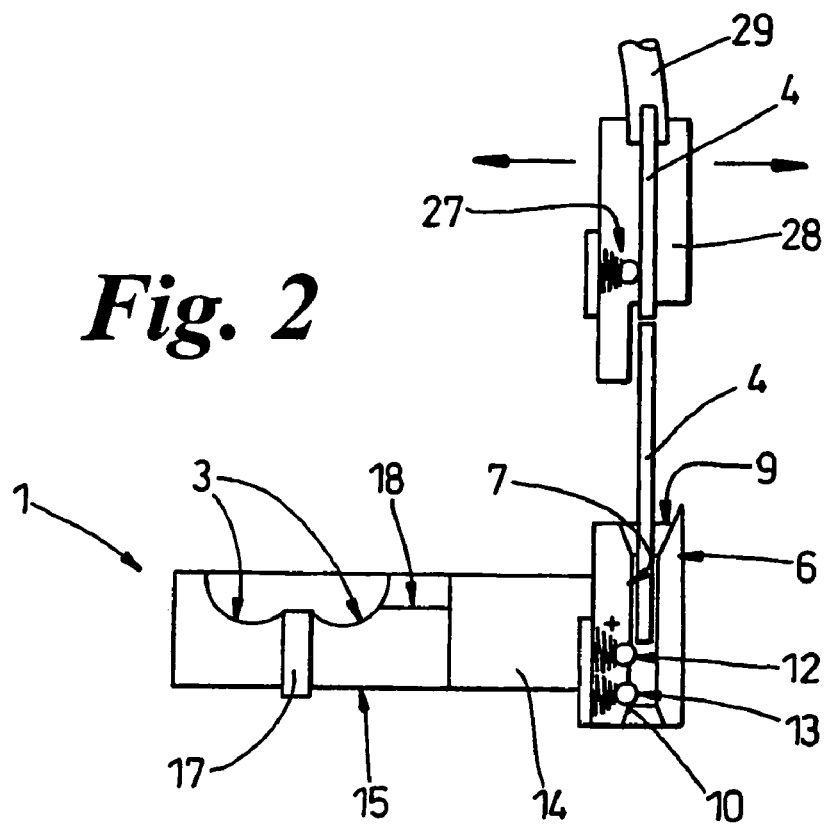
FIG. 2 is a cross-sectional side elevation of the mould assembly shown in FIG. 1 on section A—A in which a lollipop stick is being fed into the stick receiving means.
Figure 3:
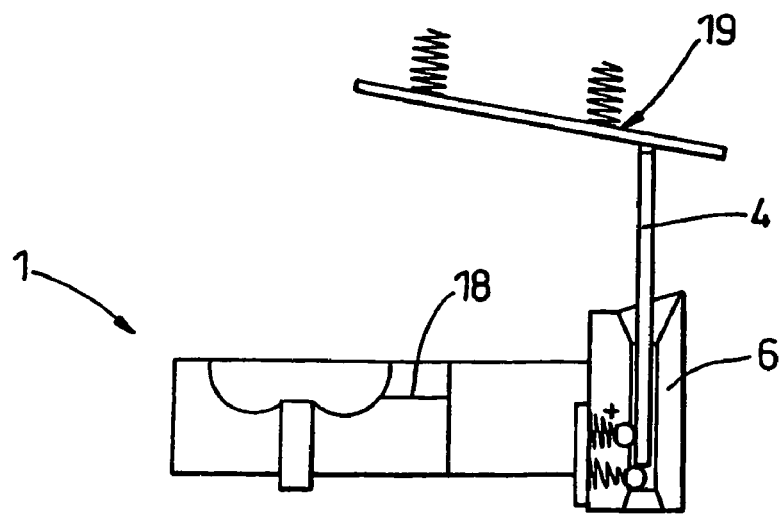
FIG. 3 is a snapshot subsequent to FIG. 2 in which a lollipop stick is being urged into the stick receiving means.
Figure 4:
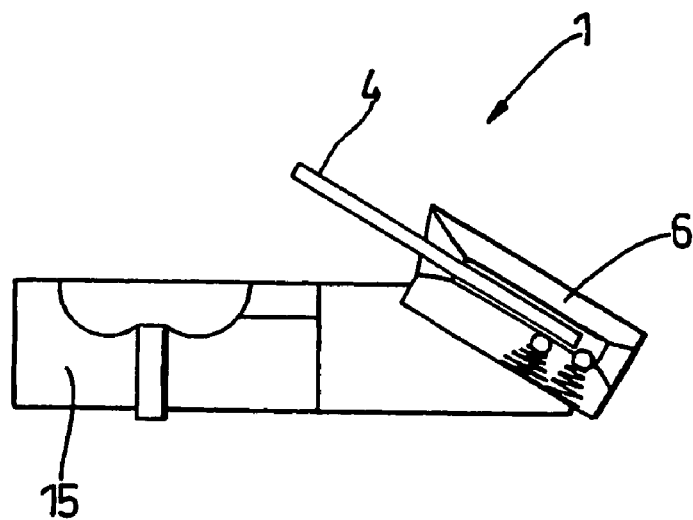
Figure 5:
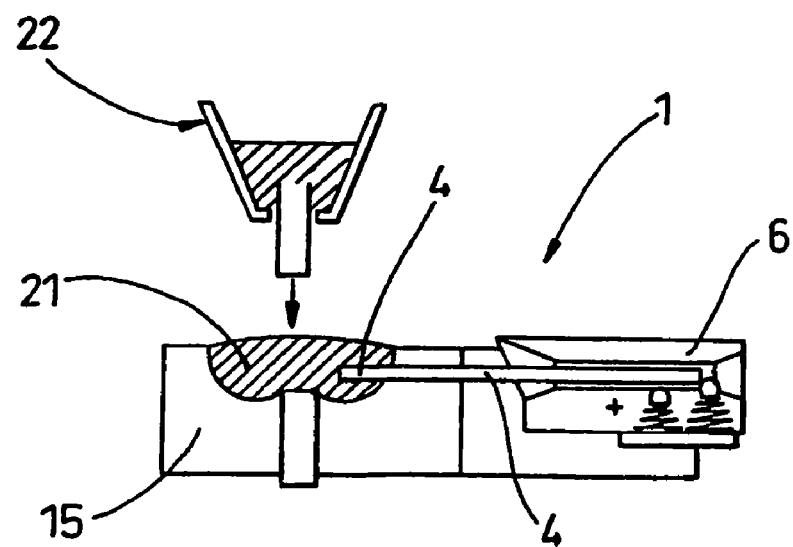
Figure 6:
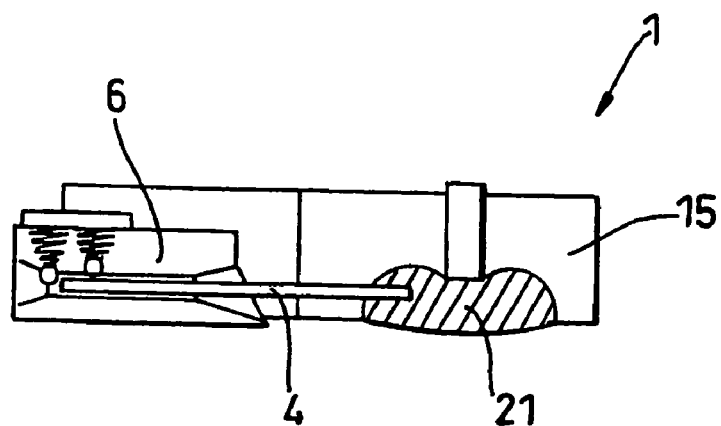
Figure 7:
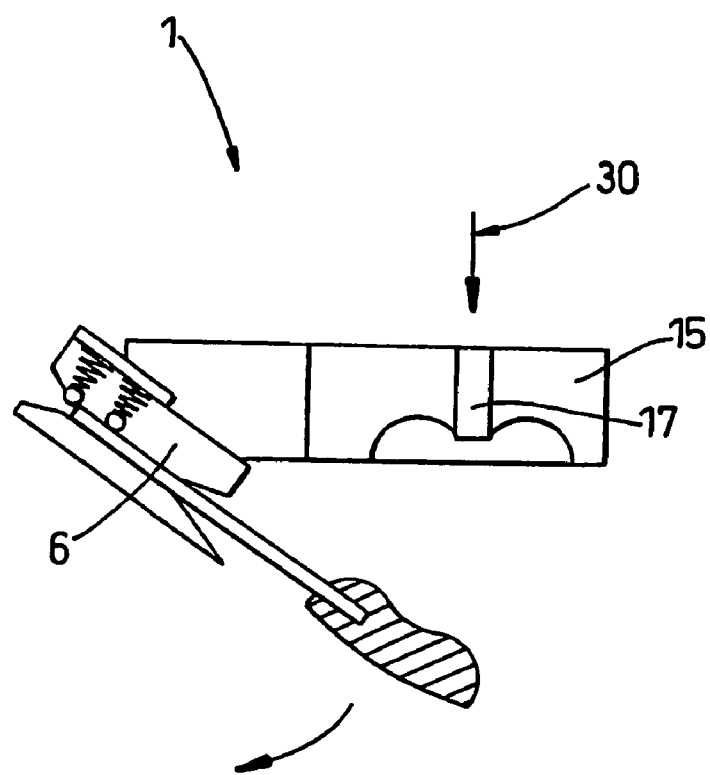
Figure 8:
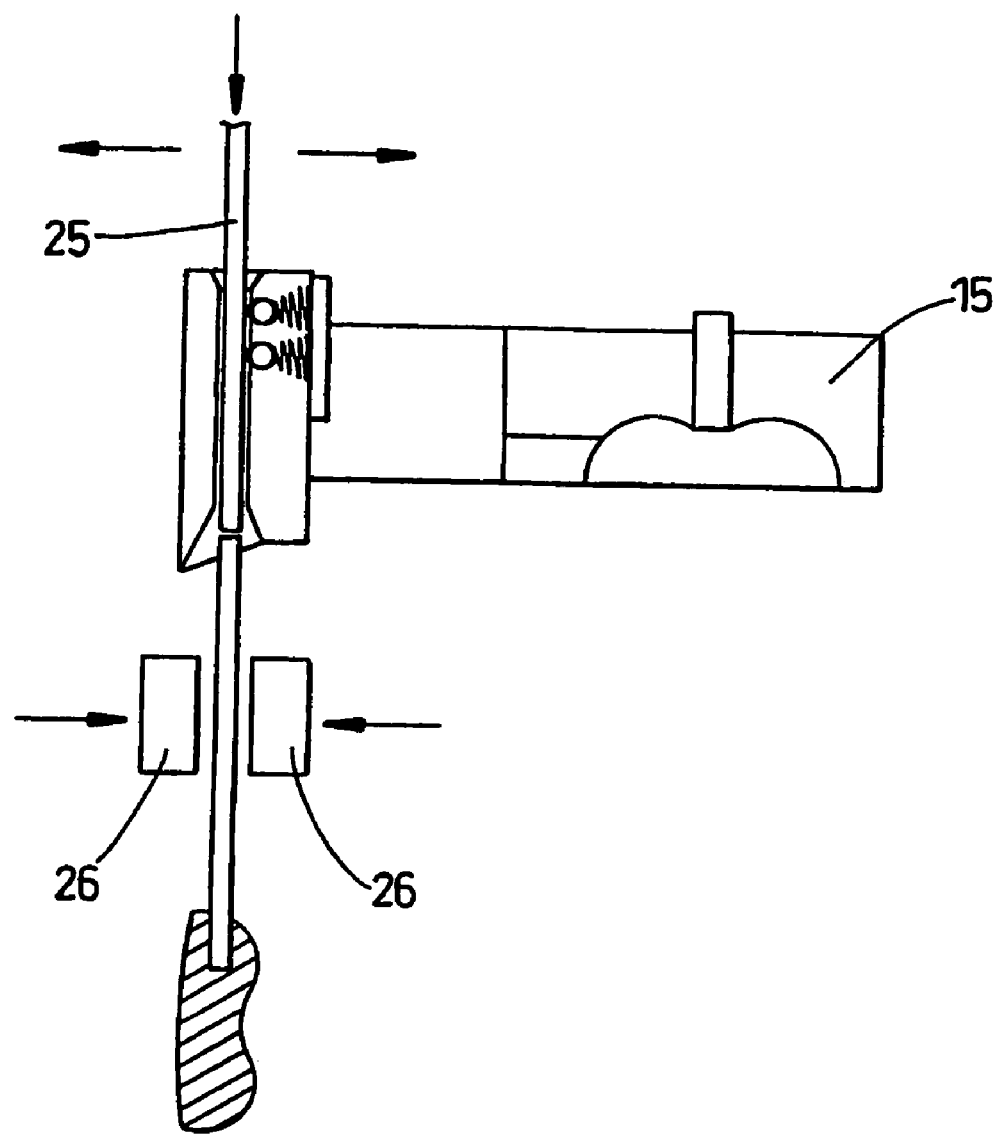
Figure 9:
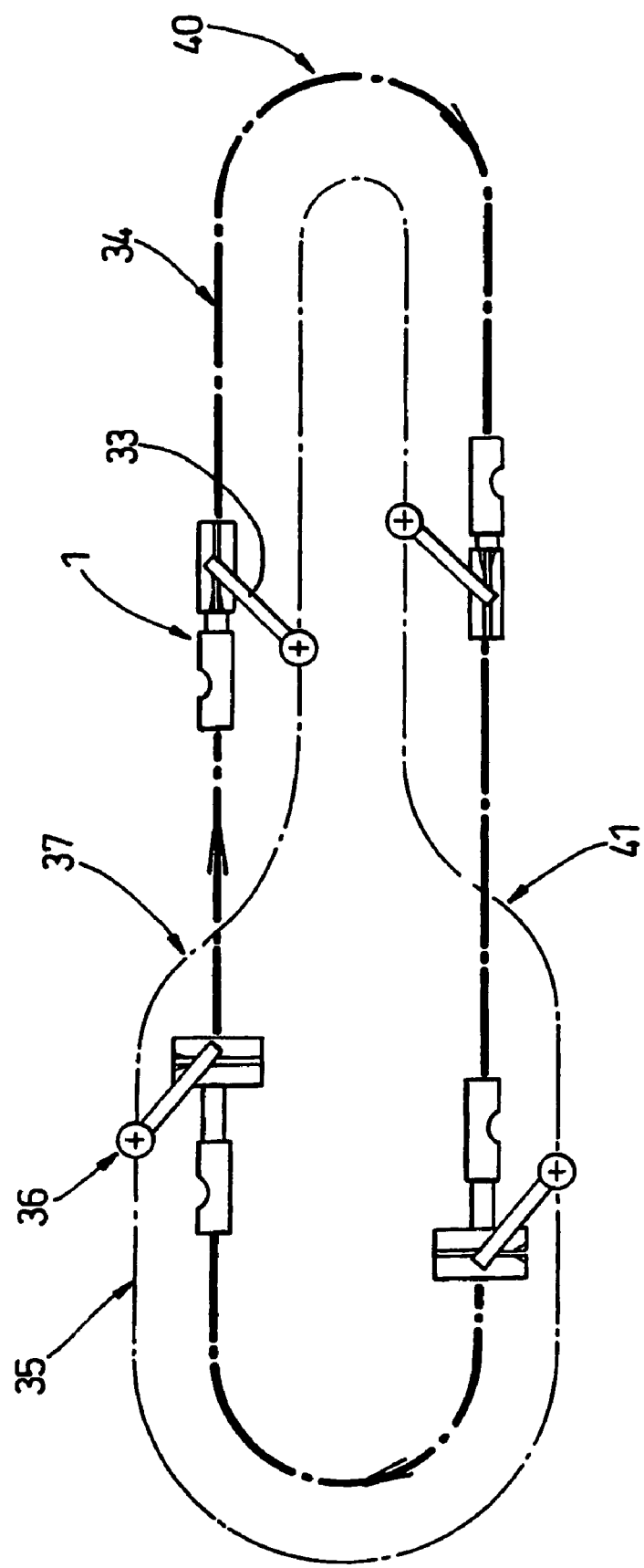

FIG. 4 is a snapshot subsequent to FIG. 3 in which the stick receiving means is pivoting towards the mould forming surface, FIG. 5 is a snapshot subsequent to FIG. 4 in which the stick receiving means is in a second condition and confectionery material is deposited into the region defined by the mould forming surface, FIG. 6 is a snapshot subsequent to FIG. 5 in which the mould assembly and the formed lollipop is inverted, FIG. 7 is a snapshot subsequent to FIG. 6 in which the stick receiving means which holds the lollipop captive is pivoted away from the mould forming surface, FIG. 8 is a snapshot subsequent to FIG. 7 on which the formed lollipop is released from the mould assembly, and FIG. 9 is a schematic representation of a lollipop manufacture circuit around which the lollipop mould assembly of FIGS. 1 to 8 is guided.

With reference to FIG. 1 there is shown a lollipop mould assembly 1 comprising stick receiving means 2 and a mould forming surface 3, the stick receiving means is pivotally mounted relative to the mould forming surface 3 by way of a pivot 5.

The stick receiving means comprises a block 6 of oblong-rectangular transverse cross-section which is provided with an open bore 7 which extends through the block, and is substantially parallel to the longitudinal axis thereof.

Frusto-conical openings 9 and 10 are provided at each end of the block 6 and are concentric with respect to the bore 7.

Two spring-loaded detent features 12 and 13 are provided internally of the bore 7 which are biased to extend into said bore The pivot 5 is attached to a side wall 14 which is perpendicular to the axis of rotation of the pivot.

The side wall 14 is integral with a portion 15 which defines the mould forming surface 3, a de-moulding conduit 17 and a location channel 18, the de-moulding conduit 17 being located centrally of the mould forming surface 3 and being open at each distal end thereof.

In use the mould assembly 1 operates as follows. The mould assembly 1 is connected to a circuit 34 which leads the assembly through the various stages of a lollipop manufacturing process. The mould assembly 1 is provided with an actuation arm 33 which at one end is rigidly attached to the block 6 and at the other is provided with a cam follower 36 which engages with a cam track 35.

With reference to FIG. 2 a conduit 29 guides sticks 4 into a stick feeder assembly 28. A spring-loaded detent feature 27 bears on the stick in the feeder assembly 28. The feeder assembly 28 is arranged for translational movement so that the feeder assembly follows the mould assembly whilst remaining in register with the bore 7 of the block 6 as the assembly 1 moves forward.

A stick 4 is urged from the feeder assembly 28 into the bore 7. The detent feature 27 ensures that only one stick at a time is issued towards the bore 7. Once a stick has been deposited into the bore 7 after having been urged past the detent 27, the feeder assembly 28 is translated in the reverse direction to the starting position ready to issue another stick.

As shown in FIG. 3, an angled vibrating plate 19 urges the stick 4 downwardly to negotiate the detent feature 12, but the plate 19 is deliberately arranged not to be sufficient to negotiate the detent feature 13. Thus the stick 4 is effectively held against the wall of the bore 7 by the detent feature 12 and is supported by detent feature 13.

As the mould assembly 1 progresses along the circuit 34, the cam track 35 is configured at 37 to pivot the actuating arm 33 (and hence the block 6) through ninety degrees. FIG. 4 shows the block 6 in an intermediate orientation between the initial vertical condition and the eventual horizontal condition.

With reference to FIG. 5, the block 6 and hence the stick 4 has been pivoted through ninety degrees and is in a horizontal condition. In such a condition the stick 4 rests on the location channel 18 and the distal free end 4 of the stick extends into a region which is defined by the mould forming surface 3. Confectionery material 21 is deposited into that region from a depositer 22.

The mould assembly 1 is then driven forwards along the circuit 34 through a cooling tunnel (not shown) turning through one hundred and eighty degrees at 40 such that the mould assembly is in an inverted condition as shown in FIG. 6.

As the assembly reaches that part of the circuit 34 which is associated with portion 41 of the cam track 35 the block 6 is caused to progressively pivot from a horizontal condition to a vertical condition. During such movement compressed air 30 is urged through the conduit 17 so as to assist in the demoulding process.

With reference to FIG. 8 an ejection pin 25 forces the newly formed lollipop though the bore 7 and in so doing overcoming the frictional retention force which has hitherto held the stick in position in the bore 7.

The falling lollipop is grabbed by two actuated jaws 26 for further processing.

After removal of the lollipop from the assembly 1 the cam track 35 is configured to ensure that the block 6 remains in the vertical condition to receiving another stick ready for the next cycle.

It will be appreciated that a plurality of juxtaposed mould assemblies 1 could be provided to form what may be formed a bar.

The path of the cam track 35 may be configured to retain the stick of the lollipop at any convenient orientation or angle either for random ejection or regimented transportation for further processing, eg wrapping.

It will be appreciated that although air ejection has been described, an alternative embodiment may comprise mechanical ejection means, for example an actuated pin.

The invention claimed is:

1. A lollipop mould assembly comprising stick receiving means (6) and a mould forming surface (3) of a mould (15), the stick receiving means being mounted for pivotal movement relative to the mould forming surface from a first condition to a second condition, the arrangement being such that, in use, a lollipop stick (4) is received by the stick receiving means in the first condition, and relative pivotal movement is then brought about to cause the stick receiving means to adopt the second condition in which confectionery material is provided into the mould and around at least part of the lollipop stick.

2. An assembly as claimed in claim 1 in which the extent of relative pivotal movement from the first condition to the second condition is substantially ninety degrees.

3. An assembly as claimed in claim 1 which comprises actuation means (33) operative to cause controlled relative pivotal movement of the stick receiving means in response to a progressive movement of the mould assembly along a circuit (34) of a lollipop manufacturing apparatus.

4. An assembly as claimed in claim 3 in which the actuation means comprises a cam follower (33) of which the movement is determined by the configuration of a cam track (35).

5. An assembly as claimed in claim 1 which comprises location means (18) which is such that when the stick (4) is in situ in the location means the stick is in the second condition.

6. An assembly as claimed in claim 1 in which in the second condition a distal end of the stick (4) is in a region which is defined by the mould forming surface (3).

7. An assembly as claimed in claim 1 in which the receiving means (6) is provided by a bore (7).

8. An assembly as claimed in claim 7 in which stick retention means (12, 13) is provided which comprises a spring loaded feature which is biased inwardly of the bore (7).

9. Lollipop manufacturing apparatus comprising lollipop stick receiving means (6), a mould comprising a mould forming surface (3) and a lollipop manufacturing circuit (34), the stick receiving means being mounted for pivotal movement relative to the mould forming surface, and stick receiving means being adapted to receive a lollipop stick (4), the arrangement of the apparatus being such that, in use, the position of the stick receiving means relative to the mould forming surface is determined by the position of the stick receiving means along the circuit.

10. A process of manufacturing lollipops comprising locating a lollipop stick (4) in stick receiving means (6) of a lollipop mould assembly, the stick receiving means being in a first condition, causing pivotal movement of the stick receiving means relative to a mould forming surface (3) of a mould (15) of the assembly so that the mould assembly adopts a second condition in which confectionery material is provided into the mould and around at least part of the lollipop stick.

* * * * *